United States Patent
Uemura

(10) Patent No.: US 10,447,944 B2
(45) Date of Patent: Oct. 15, 2019

(54) IMAGING APPARATUS, CONTROL METHOD THEREOF AND PROGRAM

(71) Applicant: CANON KABUSHIKI KAISHA, Tokyo (JP)

(72) Inventor: Hidetaka Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/925,371

(22) Filed: Mar. 19, 2018

(65) Prior Publication Data

US 2018/0278856 A1    Sep. 27, 2018

(30) Foreign Application Priority Data

Mar. 21, 2017    (JP) ................................. 2017-054304

(51) Int. Cl.
*H04N 5/262*    (2006.01)
*H04N 5/232*    (2006.01)

(52) U.S. Cl.
CPC ....... *H04N 5/2628* (2013.01); *H04N 5/23216* (2013.01); *H04N 5/23293* (2013.01)

(58) Field of Classification Search
CPC ............. H04N 5/2628; H04N 5/23216; H04N 5/23293
USPC ...................................................... 348/239
See application file for complete search history.

(56) References Cited

U.S. PATENT DOCUMENTS

| | | | | |
|---|---|---|---|---|
| 6,995,793 | B1* | 2/2006 | Albadawi | H04N 5/253 348/207.99 |
| 2005/0243209 | A1* | 11/2005 | Iwahashi | H04N 5/4403 348/556 |
| 2006/0092324 | A1* | 5/2006 | Morishige | H04N 7/0122 348/556 |
| 2007/0091196 | A1* | 4/2007 | Miyanohara | G02B 13/08 348/335 |
| 2007/0147803 | A1* | 6/2007 | Harada | G11B 20/1217 386/232 |
| 2010/0180201 | A1* | 7/2010 | Gibby | G11B 19/02 715/716 |
| 2011/0050972 | A1* | 3/2011 | Ishitsuka | H04N 5/23293 348/333.01 |

(Continued)

FOREIGN PATENT DOCUMENTS

| | | |
|---|---|---|
| JP | 06-153029 A | 5/1994 |
| JP | 2001266152 A | 9/2001 |
| JP | 2013125140 A | 6/2013 |

(Continued)

*Primary Examiner* — Antoinette T Spinks
(74) *Attorney, Agent, or Firm* — Canon U.S.A., Inc. IP Division

(57) ABSTRACT

An object is to provide an imaging apparatus which can output image data whose aspect ratio or the like has not been changed, and can perform processing for setting parameters for imaging control, on the basis of image data whose aspect ratio or the like has been changed. This imaging apparatus is provided with a transformation unit that transforms image data based on an output signal of an imaging element, a processing unit that performs processing for obtaining a value to be used for a parameter for imaging control, on the basis of the image data transformed by the transformation unit, and an output unit that can output the image data based on the output signal of the imaging element to an output destination.

10 Claims, 9 Drawing Sheets

(56) References Cited

U.S. PATENT DOCUMENTS

2018/0338091 A1\* 11/2018 Akimoto ............ H04N 5/23296

FOREIGN PATENT DOCUMENTS

| JP | 20160123127 A | 7/2016 |
|----|---------------|--------|
| WO | 2017043190 A1 | 3/2017 |

\* cited by examiner

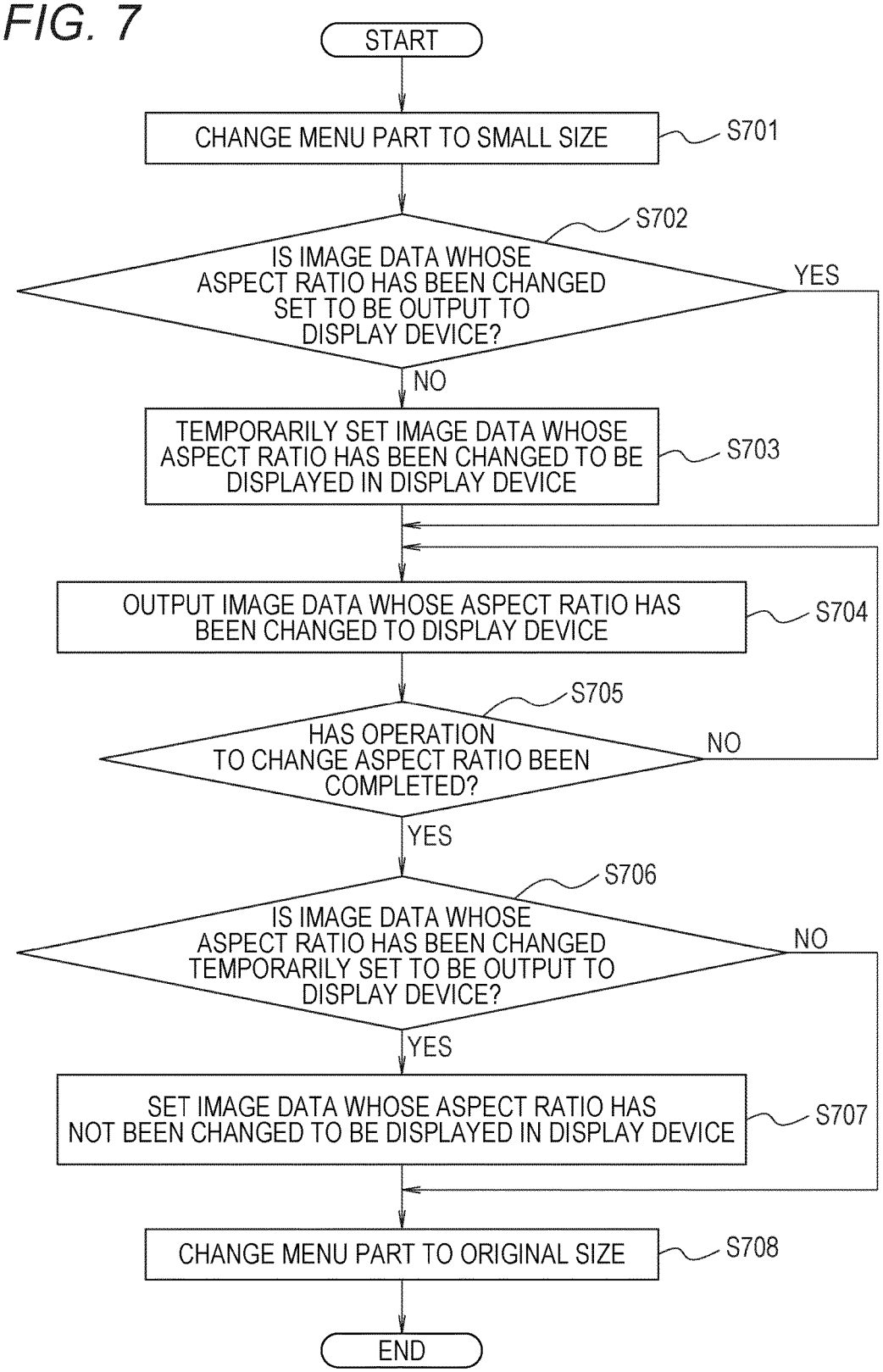

IMAGING APPARATUS, CONTROL METHOD THEREOF AND PROGRAM

BACKGROUND

Field of the Disclosure

The present disclosure relates to an imaging apparatus, a control method for the imaging apparatus, and a program.

Description of the Related Art

A technique to obtain a widescreen image by capturing an image using an anamorphic lens capable of compressing an image of a subject horizontally and enlarging the image horizontally to the original size when reproducing the image, has been conventionally used. In particular, lenses that can convert an image to give an aspect ratio of 2.4:1 called "cinema scope size" are widely used in the movie industry.

As a technique related to processing of an image captured with an anamorphic lens, Japanese Patent Laid-Open No. 6-153029 discloses a finder device which makes the subject at the time of image capturing accurately recognizable by restoring the horizontally compressed image and displaying the restored image on the finder.

In addition, as a technique related to processing of an image captured with an optical lens that enlarges the visual field in the height direction of a person, Japanese Patent Laid-Open No. 2001-266152 discloses a technique for correcting image distortion before face recognition processing.

However, the anamorphic lens is used for compressing and capturing a subject. Therefore, it is difficult to accurately recognize the subject with the finder when the subject image captured through the anamorphic lens is viewed as it is. In addition, it is difficult to accurately perform processing such as recognition-system processing for face recognition, etc., detection-system processing of a subject, evaluation-system processing of exposure and white balance, which are performed to set parameters for imaging control. In the technique disclosed in Japanese Patent Laid-Open No. 6-153029, the image displayed on the finder is formed by restoring horizontally-compressed images, but the horizontally compressed image is used in other types of processing. Accordingly, it is difficult to accurately perform processing such as recognition-system processing, detection-system processing and evaluation-system processing.

Further, when an image is recorded after the image captured by the anamorphic lens is restored to have the normal aspect ratio in the imaging apparatus, there is a possibility that the performance of aspect conversion of the imaging apparatus may not reach the user's desired level. In particular, problems such as degradation of image quality and deviation of the aspect ratio because of the error of the enlargement ratio due to lens dispersion may occur. Regarding this point, the same problem may be caused in the technique disclosed in Japanese Patent Laid-Open No. 2001-266152.

SUMMARY

An aspect of the present disclosure is to provide an imaging apparatus capable of outputting image data having an unchanged aspect ratio and performing processing for setting parameters for imaging control on the basis of image data whose aspect ratio has been changed.

An imaging apparatus according to an aspect of the present disclosure includes at least one memory device, at least one processor, and a transformation unit for transforming image data based on an output signal of an imaging unit in order to change an aspect ratio of the image data, a processing unit for performing processing for obtaining a value to be used for a parameter for imaging control, based on the image data transformed by the transformation unit; and an output unit that outputs the image data based on the output signal of the imaging element and not transformed by the transformation unit to an output destination including at least any one of a display device, an external device, and a recording medium, and the abovementioned transformation unit, processing unit, and output unit is implemented by at least abovementioned one processor executing at least one program recorded in at least one memory device described above.

Further features of the present disclosure will become apparent from the following description of exemplary embodiments with reference to the attached drawings.

BRIEF DESCRIPTION OF THE DRAWINGS

FIG. 7 is a flowchart of setting-time image processing according to one or more aspects of the present disclosure.

DESCRIPTION OF THE EMBODIMENTS

First Embodiment

Figure 1A:
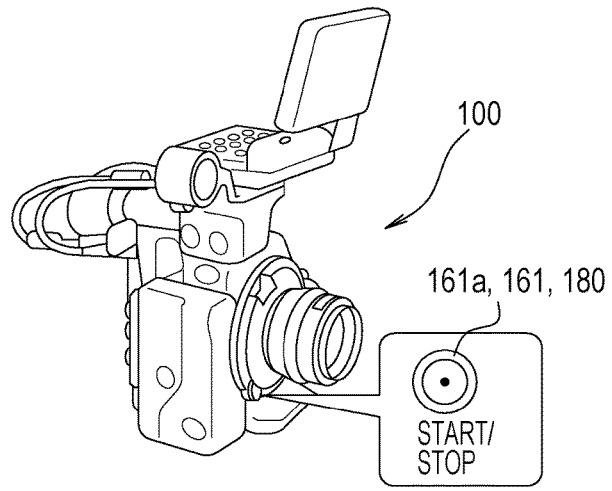
FIG. 1A is an external view of a digital video camera as viewed from a first direction.
Figure 1B:
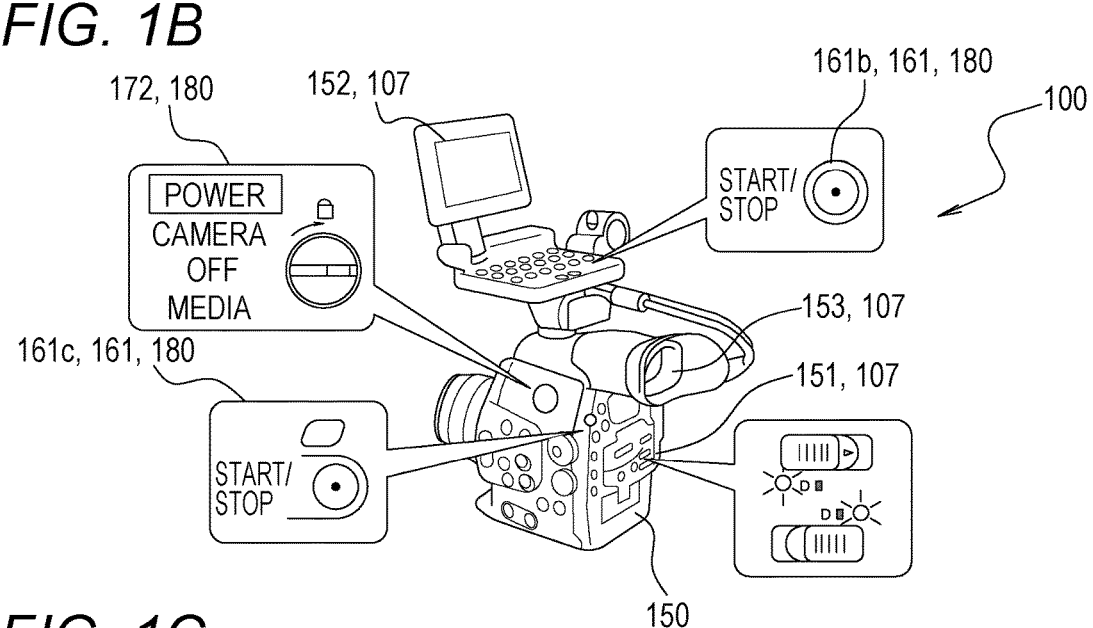
FIG. 1B is an external view of the digital video camera as viewed from a second direction.
Figure 1C:
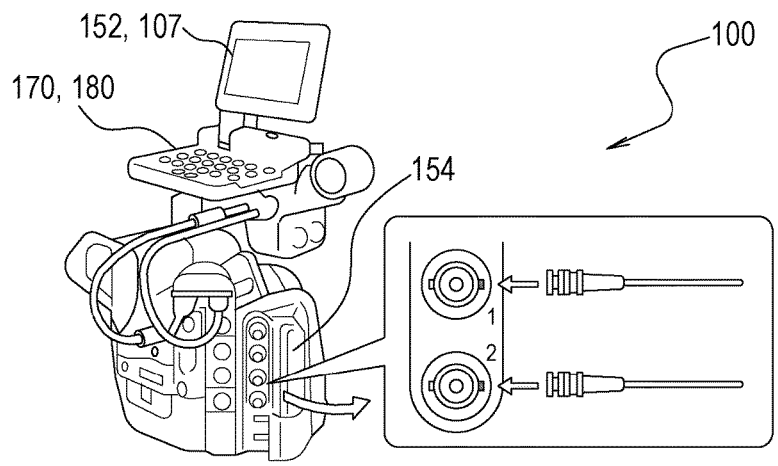
FIG. 1C is an external view of the digital video camera as viewed from a third direction.

First, with reference to FIG. 1, a digital video camera 100 according to the first embodiment will be described. FIGS. 1A to 1C are external views of the digital video camera 100 viewed from different directions.

The digital video camera 100 is an example of an imaging apparatus and is a lens-interchangeable-type digital video camera. Note that the present disclosure is not limited to the digital video camera 100, but may be applied to a single-lens reflex camera, a lens-integrated compact camera, a mobile phone with a camera function, or the like.

Figure 2:
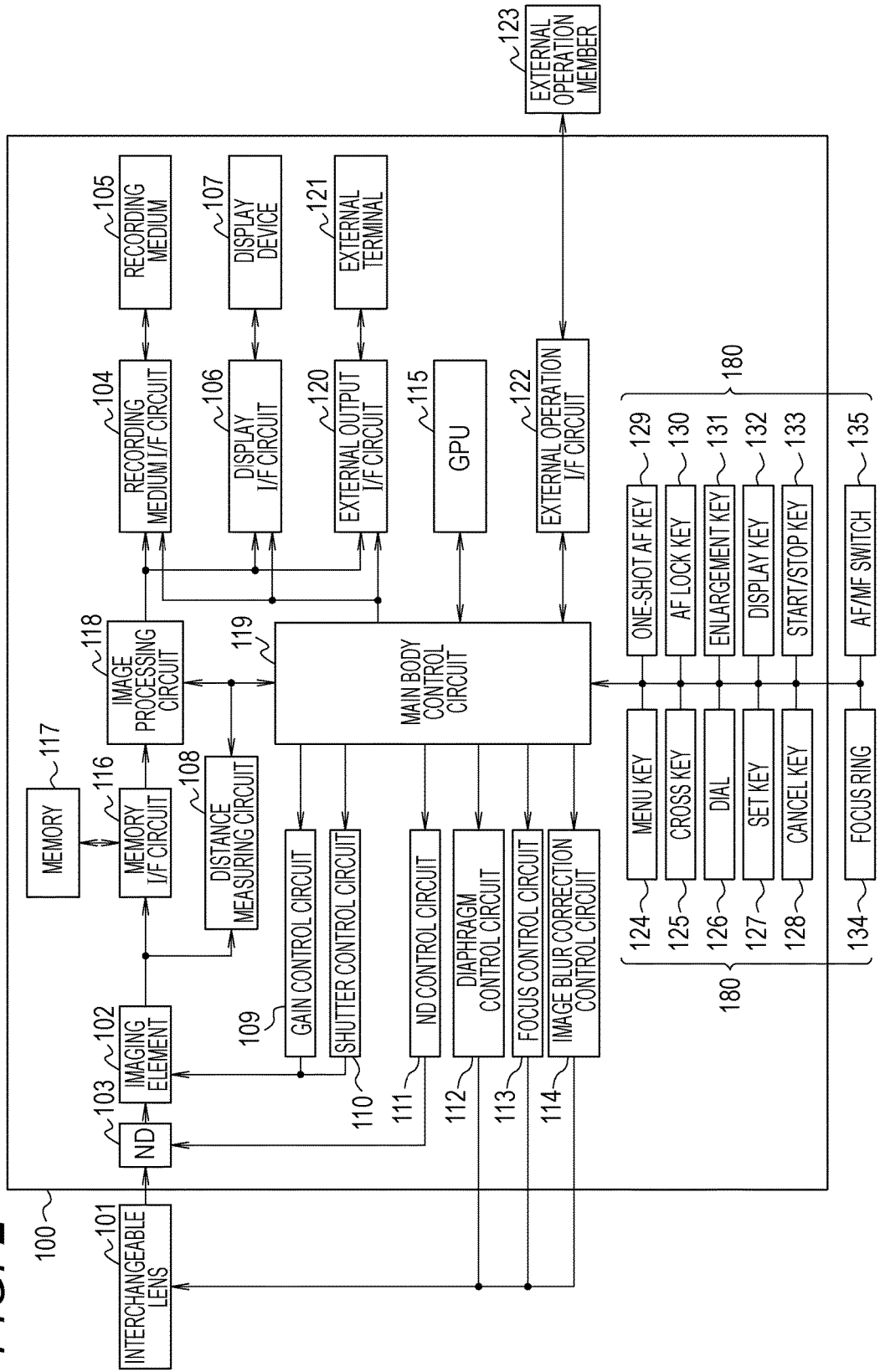
FIG. 2 is a block diagram of the digital video camera according to one or more aspects of the present disclosure.

A monitor 152 and a finder 153 are included in a display device 107 shown in FIG. 2, and display image data and various kinds of information. The monitor 152 is a liquid crystal monitor (LCD), for example. The finder 153 is an electronic viewfinder (EVF), for example.

An operation member 180 is a member for the user to perform various operations, and includes a trigger button 161, a power/mode switch 172, and an operation panel 170. The trigger button 161 is an operation button for instruction for image capturing. The trigger button 161 includes a first trigger button 161a, a second trigger button 161b, and a third trigger button 161c. The power/mode switch 172 is an operation dial for switching to power-on or power-off and to an image capturing mode or reproduction mode. The operation panel 170 includes various switches and buttons for accepting various operations from the user.

A connector 154 is a connector that outputs a video signal from the digital video camera 100 to an external device such as an external monitor or an external recording device and constitutes an external terminal 121. A battery cover 150 is a cover for holding a battery mounted in the digital video camera 100. An access lamp 151 is a lamp for displaying the state of a card slot for recording and is included in the display device 107.

Next, with reference to FIG. 2, the configuration of the digital video camera 100 will be described. FIG. 2 is a block diagram of the digital video camera 100.

An interchangeable lens 101 is an imaging lens constituted by a group of a plurality of lens, and includes a focus lens, a zoom lens, a shift lens inside, as well as diaphragm. The interchangeable lens 101 can be attached to or detached from the digital video camera 100. The interchangeable lens 101 may have an anamorphic lens.

An ND filter 103 is a filter that reduces the amount of light taken into an imaging element 102. The ND filter 103 is provided in the digital video camera 100 separately from a diaphragm provided to the lens in order to adjust the amount of incident light.

The imaging element 102 is an example of an imaging unit, and a plurality of pixels having photoelectric conversion elements are two-dimensionally arranged. The imaging element 102 applies photoelectric conversion, in each pixel, to the optical image of a subject formed by the interchangeable lens 101, and further, makes the output signal of each pixel to be subjected to analog/digital conversion by the A/D conversion circuit, and outputs an image signal (RAW image data) for each pixel, which is digital data.

A memory I/F circuit 116 writes the RAW image data of all the pixels output from the imaging element 102 in a memory 117, and reads out the RAW image data held in the memory 117 to output the data to an image processing circuit 118.

The memory 117 is a volatile recording medium for storing RAW image data of all pixels of several frames.

The image processing circuit 118 performs image processing for correcting the level difference caused by the imaging element 102 with respect to the RAW image data of all the pixels sent from the memory I/F circuit 116. The image processing circuit 118 corrects the level of the pixel in the effective region by using pixels in the optical black region (OB region) for example, or corrects defective pixels using the surrounding pixels. In addition, the image processing circuit 118 performs various types of processing such as correction against decrease in marginal illumination, color correction, edge enhancement, noise removal, gamma correction, debayer, and compression. In addition, the image processing circuit 118 also performs enlargement/reduction processing of an image, detection and recognition processing of a subject, evaluation value calculation processing of exposure and white balance, and the like.

A main body control circuit 119 includes a CPU, a ROM, a RAM, and the like, and the CPU unfolds the program stored in the ROM in the working area of the RAM and executes the program so as to control the overall operation of the digital video camera 100. In addition, the main body control circuit 119 implements each processing of the present embodiment to be described later by executing the program stored in the ROM. In the RAM, constants and variables for operation of the main body control circuit 119, programs read out from the ROM, and the like are unfolded.

A recording medium I/F circuit 104 is an interface between a recording medium 105 and the digital video camera 100. The recording medium I/F circuit 104 performs control for recording the image data output from the image processing circuit 118 in the recording medium 105 and control for reading out the image data recorded on the recording medium 105.

The recording medium 105 is a recording medium composed of a semiconductor memory or the like for recording image data including captured images, and executes recording of image data and reading of recorded image data according to control by the recording medium I/F circuit 104.

A display I/F circuit 106 performs superimposing synthesis and resizing processing of the image data from the image processing circuit 118 and the image data of the video RAM (VRAM) drawn by a GPU 115, and outputs the resultant image data to the display device 107. The resizing performed by the display I/F circuit 106 is, for example, processing of making the image data agree with the number of pixels of the display device 107.

In addition, when the main body control circuit 119 makes the enlarged display mode valid, the display I/F circuit 106 performs superimposing synthesis and resizing processing on the partial area of the video data. As a result, in the enlarged display mode, since the image enlarged more than in the normal state is displayed on the display device 107, the camera user can easily perform the manual focus (MF) adjustment operation more accurately.

The display device 107 is the monitor 152 or the finder 153 for displaying the image data output from the display I/F circuit 106 for view angle confirmation.

A distance measuring circuit 108 measures the distance of the subject by the phase difference AF, for example.

The GPU 115 is a rendering engine that generates image data for display of various kinds of information and for the menu screen of the digital video camera 100 and outputs the data to the VRAM. In addition to the drawing function for character strings and figures, the GPU 115 also has an enlargement/reduction drawing function, a rotation drawing function, and a layer synthesis function. The image data in the VRAM generated by the GPU 115 has an alpha channel representing transmittance and can be subjected to on-screen display on an image by the display I/F circuit 106.

A gain control circuit 109, a shutter control circuit 110, an ND control circuit 111, and a diaphragm control circuit 112, which will be described next, all perform processing for exposure control. The main body control circuit 119 controls these control circuits based on the result of calculation by the main body control circuit 119, of the luminance level of the image data output from the image processing circuit 118 or based on the operation parameters manually set by the user.

The gain control circuit 109 controls the gain of the imaging element 102.

The shutter control circuit 110 controls the shutter speed of the imaging element 102.

The ND control circuit 111 controls the amount of light incident on the imaging element 102 via the ND filter 103.

The diaphragm control circuit 112 controls the diaphragm of the interchangeable lens 101.

A focus control circuit 113 operates differently depending on whether the focus drive state held by the main body control circuit 119 is autofocus (AF) or manual-focus (MF).

When the state is MF, the focus control circuit 113 stops the control. In this case, the user as a video shooter can freely adjust focus by rotating a focus ring 134 incorporated in the interchangeable lens 101.

In the case of AF, the main body control circuit 119 obtains the focusing information by calculation with reference to the image data output from the image processing circuit 118, and the focus control circuit 113 controls the focus lens inside the interchangeable lens 101 based on the calculation result. The main body control circuit 119 may set the AF frame in the partial area of the image data and can also obtain focusing information by calculation based on only the subject in the AF frame.

The AF has two more operation modes. One is a one-shot AF mode, in which AF control is performed only when a one-shot AF key 129 is pressed, and control of the focus control circuit 113 is stopped after whether the focusing is successful or failed is determined. The other mode is a mode which is called a servo AF mode or a continuous AF mode and which always performs AF control. However, even in the continuous AF mode, when the AF lock state is set by depression of an AF lock key 130, the control of the focus control circuit 113 is suspended. Switching between the two modes is performed by setting change in the menu screen.

An image blur correction control circuit 114 performs optical image stabilization processing for controlling the shift lens inside the interchangeable lens 101 so as to cancel out the image blur based on the motion vector calculated by the main body control circuit 119. Alternatively, the image blur correction control circuit 114 performs electronic image stabilization processing for cutting out the image data in each frame of the moving image in the direction for canceling out the image blur. The main body control circuit 119 calculates the motion vector of the subject with the main body control circuit 119 with reference to the image data output from the image processing circuit 118.

An external output I/F circuit 120 performs a resizing processing on the video data from the image processing circuit 118. Also, the circuit performs signal conversion suitable for the standard of the external terminal 121 and gives a control signal, outputting image data to the external terminal 121.

The external terminal 121 is a terminal for outputting image data to an external device and is an SDI terminal or an HDMI (registered trademark) terminal, for example. A monitor display and an external recording device can be connected to the external terminal 121.

An external operation I/F circuit 122 is an interface for receiving a control instruction from an external operation member 123 and notifying the main body control circuit 119 about the instruction. The external operation I/F circuit 122 is, for example, an infrared remote control light receiving circuit, a wireless LAN interface, or LANC (registered trademark).

The external operation member 123 transmits a control instruction to the external operation I/F circuit 122. The external operation member 123 can transmit an instruction corresponding to the operation of each part of the operation member 180 incorporated in the digital video camera 100 or the interchangeable lens 101. Further, the external operation member 123 can transmit the setting change information on a menu screen displayed on the display device 107.

The operation member 180 receives an operation by the user and notifies the main body control circuit 119 about the control instruction. The operation member 180 is composed of members such as a key (button), a dial, a tact switch, a ring, and the like. In the first embodiment, the focus ring 134 of the operation member 180 and an AF/MF switch 135 are provided on the interchangeable lens 101, and other operation members 180 are provided on the digital video camera 100. A part of the operation member 180 can exchange the role of the key or assign the key to another function according to the setting on the menu screen.

A menu key 124 gives an instruction to display a menu screen on the display device 107 or an instruction to close the already opened menu screen.

A cross key 125 and a dial 126 both give an instruction to move a cursor for selecting an item in the menu screen and to move a frame display concerning the focus in the direction desired by the user.

A SET key 127 gives an instruction to select an item where the cursor is positioned in the menu screen or to determine various setting operations.

A cancel key 128 gives an instruction for a return to the immediately preceding hierarchy when making selection in a deep hierarchy on the menu screen or discard various setting operations.

The one-shot AF key 129 gives an instruction to drive AF by the focus control circuit 113 when the AF mode is one shot AF.

When the AF mode is the continuous AF, the AF lock key 130 gives an instruction to stop the control by the focus control circuit 113 or to cancel the control stop state.

An enlargement key 131 gives an instruction to enlarge or restore the image displayed on the display device 107.

A DISPLAY key 132 instructs to change a Disp level held by the main body control circuit 119. Various kinds of information display performed on the display device 107 is restricted based on the selected Disp level, so that more detailed information can be displayed or images can be displayed more clearly.

A START/STOP key 133 instructs the recording medium I/F circuit 104 to start and stop recording.

When the focus driving state is MF, the focus ring 134 can move the focus lens in the interchangeable lens 101 to perform focus adjustment.

The AF/MF switch 135 instructs to switch the focus drive state, namely, switch AF and MF to each other.

The functional blocks other than the blocks representing hardware among the blocks of the digital video camera 100 shown in FIG. 2 may be implemented by hardware such as an ASIC or a programmable logic array (PLA). Further, the functional block may be achieved by the main body control circuit 119 executing software. Still further, the functional block may be achieved by a combination of software and hardware. In the following description, the same hardware can be implemented as the subject even when different functional blocks are described as the operational subjects.

The blocks representing hardware among blocks shown in FIG. 2, include at least the ND filter 103, the imaging element 102, the display device 107, the recording medium 105, the memory 117, the external terminal 121, the main body control circuit 119, and the operation member 180.

Further, the operation member 180, the display device 107, and the external terminal 121 are exposed on the surface of the digital video camera 100.

Figure 3:
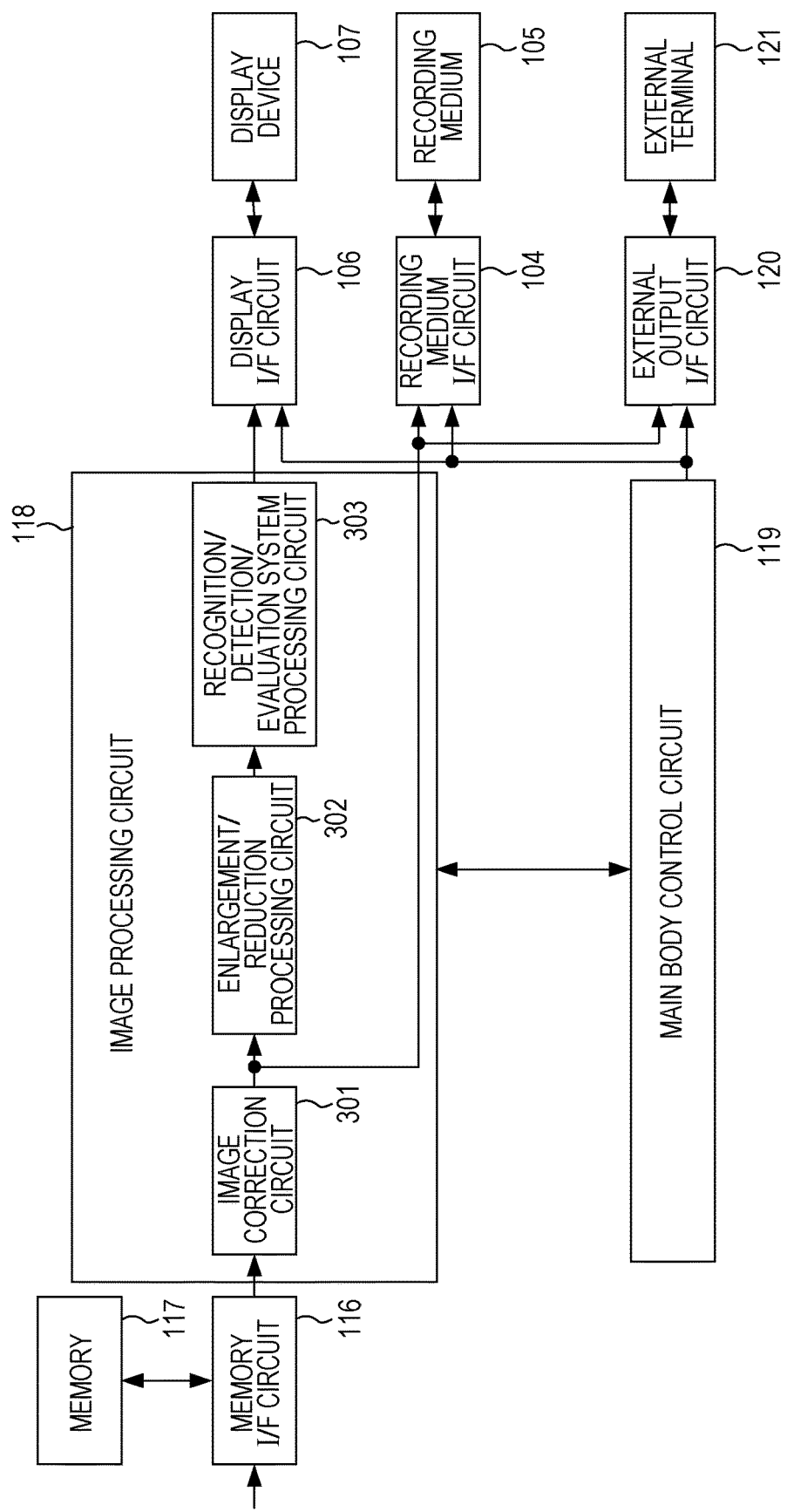
FIG. 3 is a block diagram for illustrating image processing according to one or more aspects of the present disclosure.

Next, image processing according to the first embodiment will be described with reference to FIG. 3. FIG. 3 is a block diagram for illustrating image processing according to the first embodiment. As shown in FIG. 3, the image processing circuit 118 includes an image correction circuit 301, an enlargement/reduction processing circuit 302, and a recognition/detection/evaluation system processing circuit 303. Details of each part of the image processing circuit 118 will be described next.

The memory I/F circuit 116 writes the RAW image data of all the pixels output from the imaging element 102 to the memory 117. In addition, the memory I/F circuit 116 reads out the RAW image data held in the memory 117 and outputs the data to the image correction circuit 301 of the image processing circuit 118.

The image correction circuit 301 performs image processing for correcting the level difference of the output signal of the imaging element 102 caused by the imaging element 102 with respect to the RAW image data of all the pixels output from the memory I/F circuit 116. To be more specific, the image processing circuit 118 corrects the level of the pixel in the effective region using the pixels in the OB region, or corrects defective pixels using the surrounding pixels, for example, thereby generating corrected image data.

The image correction circuit 301 outputs the corrected image data to the enlargement/reduction processing circuit 302, the recording medium I/F circuit 104, and the external output I/F circuit 120. The image correction circuit 301 outputs the corrected image data to the recording medium 105 via the recording medium I/F circuit 104 by outputting the corrected image data to the recording medium I/F circuit 104. Similarly, the image correction circuit 301 outputs the corrected image data to the external output I/F circuit 120, thereby outputting the corrected image data to the external terminal 121 via the external output I/F circuit 120.

The enlargement/reduction processing circuit 302 transforms the image data by performing at least one of enlargement and reduction on the image data output from the image correction circuit 301. To be more specific, the enlargement/reduction processing circuit 302 changes the aspect ratio of the image data output from the image correction circuit 301. The enlargement/reduction processing circuit 302 outputs the image data whose aspect ratio has been changed to the recognition/detection/evaluation system processing circuit 303.

The recognition/detection/evaluation system processing circuit 303 performs at least one of recognition processing, detection processing, and evaluation processing based on the image data whose aspect ratio has been changed.

The detection processing includes, for example, subject detection processing for detecting a subject from image data, and moving subject detection processing for detecting a moving subject from image data. The subject detection processing includes a face detection processing for detecting a face and a human body detection processing for detecting a human body.

The recognition processing is processing of performing a predetermined recognition based on the detection result of the detection processing. The recognition processing includes a face recognition processing of performing recognition using a face detected based on image data.

The subject detection processing, moving subject detection processing, and face recognition processing are used to determine the area to be the main subject from the image data, and on the basis of the result, setting of the AF frame and setting of the evaluation area where the weight is increased at the time of exposure control are performed.

The evaluation processing is processing of calculating a predetermined evaluation value based on the image data. The evaluation value includes an evaluation value of exposure and an evaluation value of white balance.

These results obtained by the recognition/detection/evaluation system processing circuit 303 are used for parameter setting for imaging control such as AF, AE and white balance of the digital video camera. Therefore, these types of processing by the recognition/detection/evaluation system processing circuit 303 need to be carried out in real time with respect to imaging of moving images.

The recognition/detection/evaluation system processing circuit 303 outputs the image data to the display I/F circuit 106. The recognition/detection/evaluation system processing circuit 303 outputs the image data to the display device 107 via the display I/F circuit 106 by outputting the image data to the display I/F circuit 106.

The display I/F circuit 106 performs superimposing synthesis on the image data whose aspect ratio has been changed by the enlargement/reduction processing circuit 302 and the image data created by the GPU 115, and further performs resizing processing on the synthesized data to be output to the display device 107. The display device 107 displays the image data output from the display I/F circuit 106 for confirmation of the angle of view.

The recording medium I/F circuit 104 outputs the image data output from the image correction circuit 301 to the recording medium 105, and records the data in the recording medium 105.

The external output I/F circuit 120 resizes the image data output from the image correction circuit 301 and outputs the data to the external terminal 121.

The image data output to the recording medium I/F circuit 104 and the external output I/F circuit 120 is image data output from the image correction circuit 301 as described above, and is image data having an aspect ratio not changed by the enlargement/reduction processing circuit 302.

The image processing circuit 118 includes a first image signal path and a second image signal path as a path through which the image data is sent.

The first image signal path is a path through which the image data corrected by the image correction circuit 301 is directly output. In the example of FIG. 3, the first image signal path is a path connecting the image correction circuit 301, the recording medium I/F circuit 104, and the external output I/F circuit 120.

The second image signal path is a path in which the image data corrected by the image correction circuit 301 is output with the aspect ratio changed by the enlargement/reduction processing circuit 302. In the example of FIG. 3, the second image signal path is a path connecting the image correction circuit 301, the enlargement/reduction processing circuit 302, the recognition/detection/evaluation system processing circuit 303, and the display I/F circuit 106.

As described above, image data that is captured while being compressed by an anamorphic lens or the like is output to the recording medium 105 and the external terminal 121 by the first image signal path. Thus, the captured image data is recorded on the recording medium 105 or output to the external terminal 121 without being subjected to image processing other than correction performed by the image correction circuit 301. Therefore, image data recorded on the recording medium 105 or output to the external terminal 121 does not deteriorate in image quality, and further, there is no occurrence of deviation of the aspect caused by the error of the enlargement ratio due to lens variation.

Further, the image data captured while being compressed by an anamorphic lens or the like is sent to the recognition/detection/evaluation system processing circuit 303 by the second image signal path. The recognition/detection/evaluation system processing circuit 303 performs various types of processing based on the image data whose aspect ratio has been changed by the enlargement/reduction processing circuit 302. Accordingly, the recognition/detection/evaluation system processing circuit 303 can perform the recognition processing, detection processing, and evaluation processing with the image data of the regular aspect ratio, so that the accuracy of the recognition processing, detection processing, and evaluation processing improves.

In this manner, the digital video camera 100 can output image data with the aspect ratio unchanged, and can perform predetermined processing based on image data whose aspect ratio has been changed.

Second Embodiment

Next, the digital video camera 100 according to the second embodiment will be described. Points in the second embodiment, which are similar to those of the first embodiment, are denoted by the same reference numerals, and description thereof is omitted.

Figure 4:
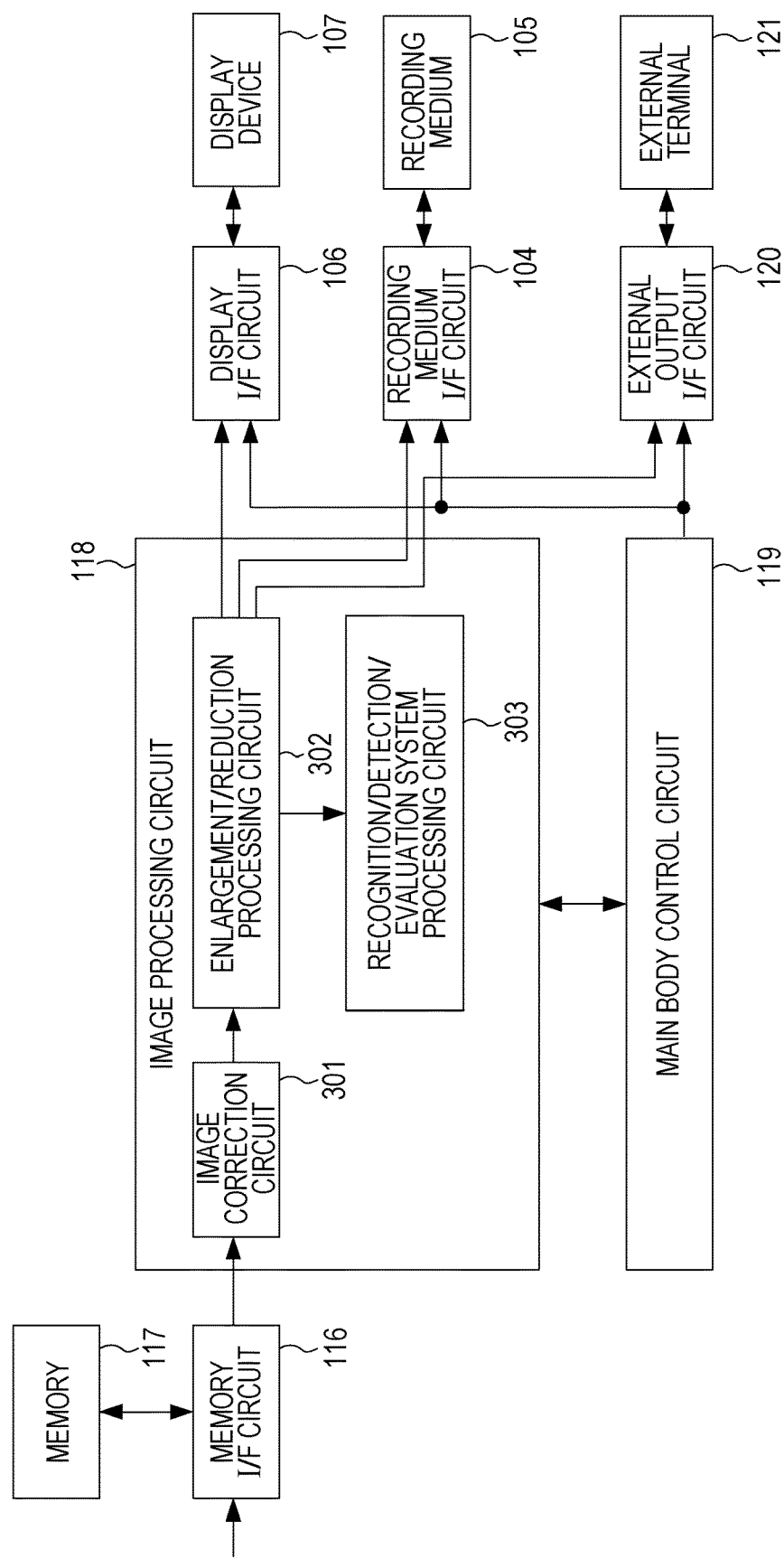
FIG. 4 is a block diagram for illustrating image processing according to one or more aspects of the present disclosure.

First, image processing according to the second embodiment will be described with reference to FIG. 4. FIG. 4 is a block diagram for illustrating image processing according to the second embodiment.

Processing performed by the memory I/F circuit 116 and the image correction circuit 301 is similar to processing in the first embodiment described with reference to FIG. 3. However, in the second embodiment, the image correction circuit 301 outputs the corrected image data to only the enlargement/reduction processing circuit 302.

The enlargement/reduction processing circuit 302 performs processing based on the aspect setting which is the setting related to the change of the aspect ratio. The aspect setting includes an aspect ratio setting and an aspect validity setting. The information on the aspect setting is stored in the RAM of the main body control circuit 119, the recording medium 105, and the like.

The aspect ratio setting is a setting that represents the amount of change of the aspect ratio. In the second embodiment, the aspect ratio setting is expressed by a change magnification of the aspect ratio. The change magnification of the aspect ratio includes the change magnification in the horizontal direction (H) and the change magnification in the vertical direction (V). The enlargement/reduction processing circuit 302 changes the aspect ratio of the image data in accordance with the aspect ratio setting.

The enlargement/reduction processing circuit 302 changes or does not change the aspect ratio of the input image data based on the aspect validity setting. The aspect validity setting includes internal recording aspect setting, display device aspect setting, and external output aspect setting.

The internal recording aspect setting is setting as to whether to record image data whose aspect ratio has been changed by the enlargement/reduction processing circuit 302, in the recording medium 105. When the internal recording aspect setting is "valid", the enlargement/reduction processing circuit 302 outputs the image data whose aspect ratio has been changed, to the recording medium I/F circuit 104. When the internal recording aspect setting is "invalid", the enlargement/reduction processing circuit 302 outputs the image data whose aspect ratio has not been changed, to the recording medium I/F circuit 104. Note that the image data whose aspect ratio has not been changed is the image data output from the image correction circuit 301.

The display device aspect setting is a setting as to whether to display, on the display device 107, the image data whose aspect ratio has been changed by the enlargement/reduction processing circuit 302. When the display device aspect setting is "valid", the enlargement/reduction processing circuit 302 outputs the image data whose aspect ratio has been changed, to the display I/F circuit 106. When the display device aspect setting is "invalid", the enlargement/reduction processing circuit 302 outputs the image data whose aspect ratio has not been changed, to the display I/F circuit 106.

The external output aspect setting is a setting as to whether to display, on the external terminal 121, the image data whose aspect ratio has been changed by the enlargement/reduction processing circuit 302. When the external output aspect setting is "valid", the enlargement/reduction processing circuit 302 outputs the image data whose aspect ratio has been changed, to the external output I/F circuit 120. When the external output aspect setting is "invalid", the enlargement/reduction processing circuit 302 outputs the image data whose aspect ratio has not been changed, to the external output I/F circuit 120.

When at least one of the internal recording aspect setting, the display device aspect setting, and the external output aspect setting is "valid", the enlargement/reduction processing circuit 302 performs processing for changing the aspect ratio of the image data output from the image correction circuit 301 according to the aspect ratio setting.

Figure 5:
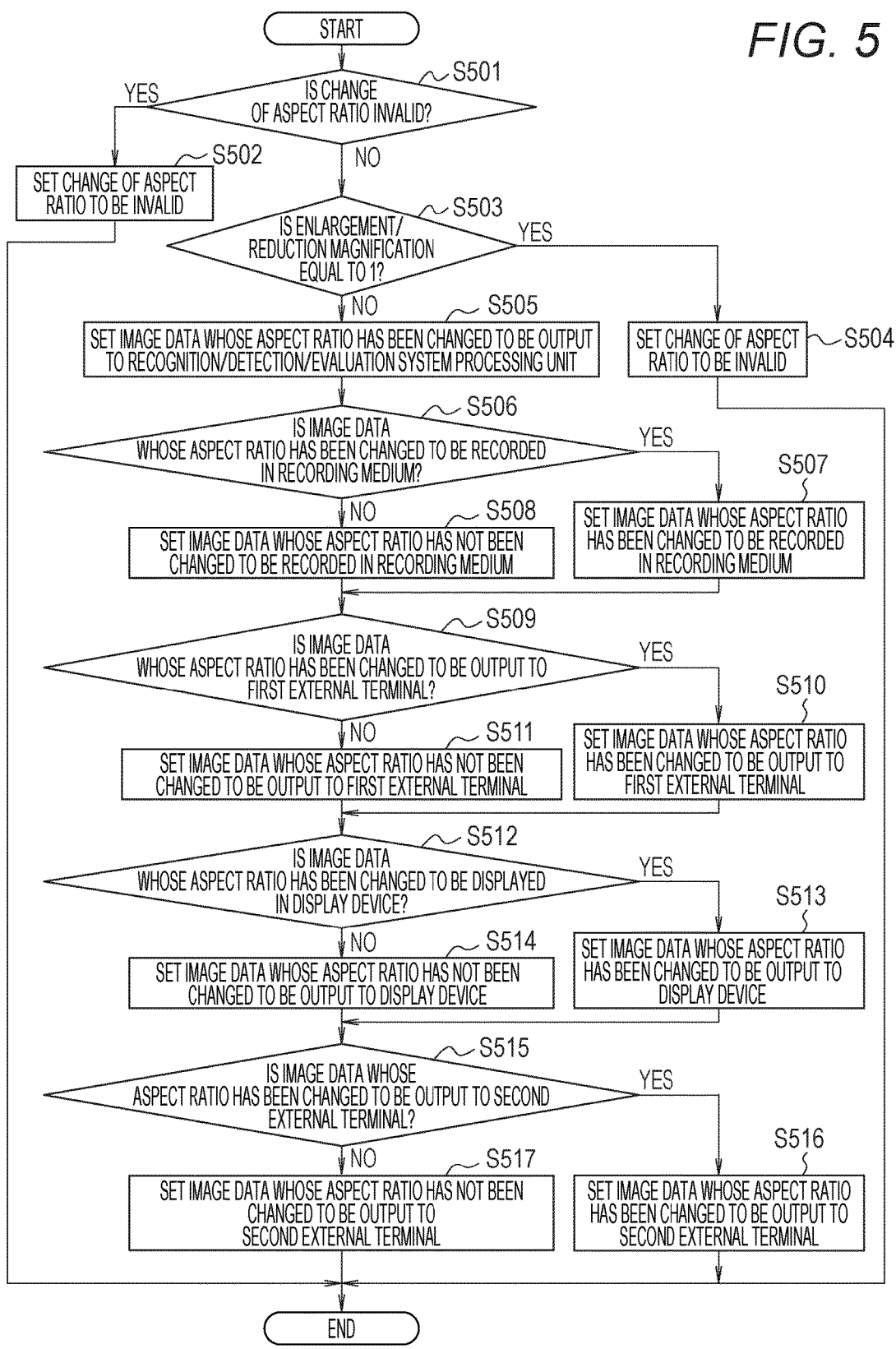
FIG. 5 is a flowchart of a setting processing according to one or more aspects of the present disclosure.

Next, setting processing will be described with reference to FIG. 5. FIG. 5 is a flowchart of the setting processing. The setting processing is processing for setting the aspect validity setting specified on a setting screen 601 to be described later with reference to FIGS. 6A to 6F in the digital video camera 100 and reflecting the setting thereon. The setting processing in FIG. 5 is executed when the main body control circuit 119 receives an operation to set designation made on the setting screen 601, to the digital video camera 100, such as depression of the SET key 127 on the setting screen 601.

In the illustration of FIG. 5, it is assumed that the external terminal 121 has a first external terminal and a second external terminal. The first external terminal is a terminal for outputting image data for recording. The second external terminal is a terminal for outputting image data for confirmation for the user or the like to check with an external monitor or the like.

Figure 6A:
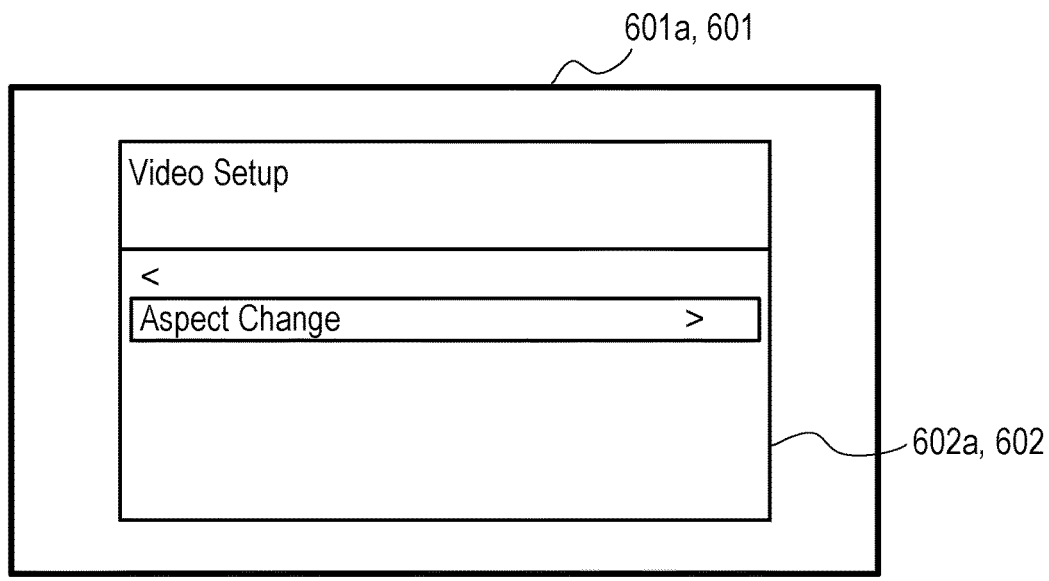
FIG. 6A is a diagram showing a camera setting screen.
Figure 6B:
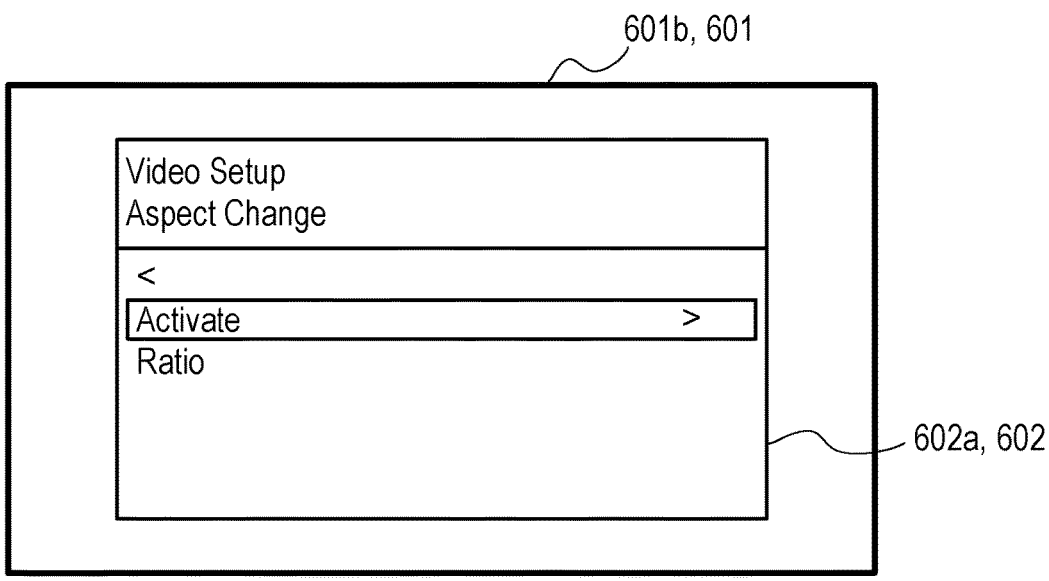
FIG. 6B is a diagram showing an aspect setting screen.
Figure 6C:
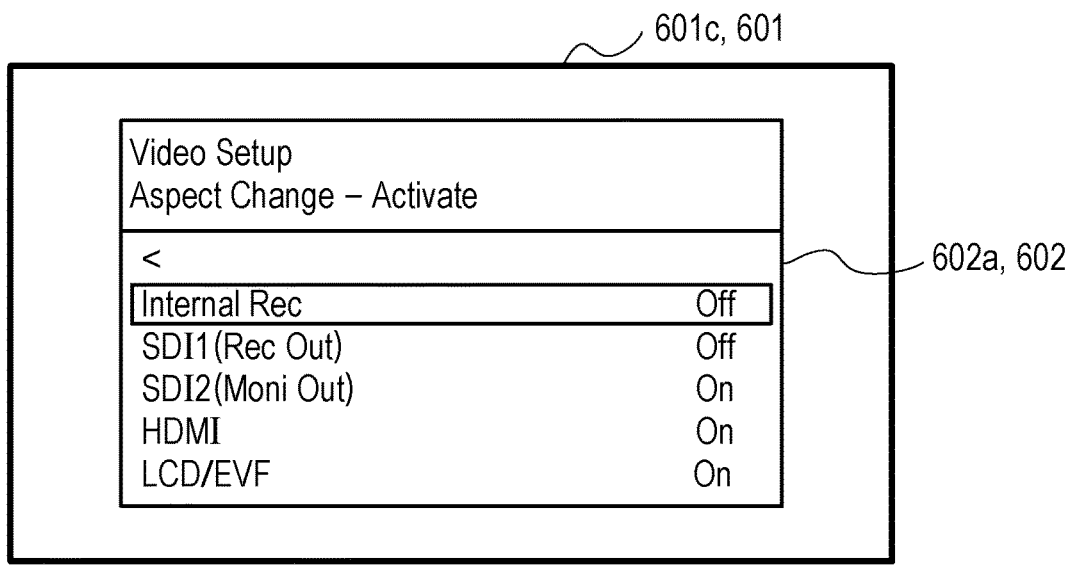
FIG. 6C is a diagram showing a first validity setting screen.

In step S501, the main body control circuit 119 determines whether designation for invalidating the change in the aspect ratio has been made on a first validity setting screen 601c shown in FIG. 6C. The first validity setting screen 601c is one of the setting screens 601, and is a setting screen that enables designation of the internal recording aspect setting, display device aspect setting, and external output aspect setting. In the example of FIG. 5, since the external terminal 121 has the first external terminal and the second external terminal, correspondingly, the external output aspect setting also includes the first external output aspect setting and the second external output aspect setting.

For example, when all of the internal recording aspect setting, display device aspect setting, first external output aspect setting, and second external output aspect setting are designated to be "invalid", the main body control circuit 119 determines that designation that makes the change of the aspect ratio invalid has been carried out.

The main body control circuit 119 advances the processing to step S502 when designation for invalidating the change of the aspect ratio has been made, and advances the processing to step S503 when the designation for invalidating the change of the aspect ratio has not been made.

In step S502, the main body control circuit 119 saves information indicating "invalid" for all of the internal recording aspect setting, display device aspect setting, first external output aspect setting, and second external output aspect setting. As a result, the main body control circuit 119 sets so as not to change the aspect ratio.

Figure 6D:
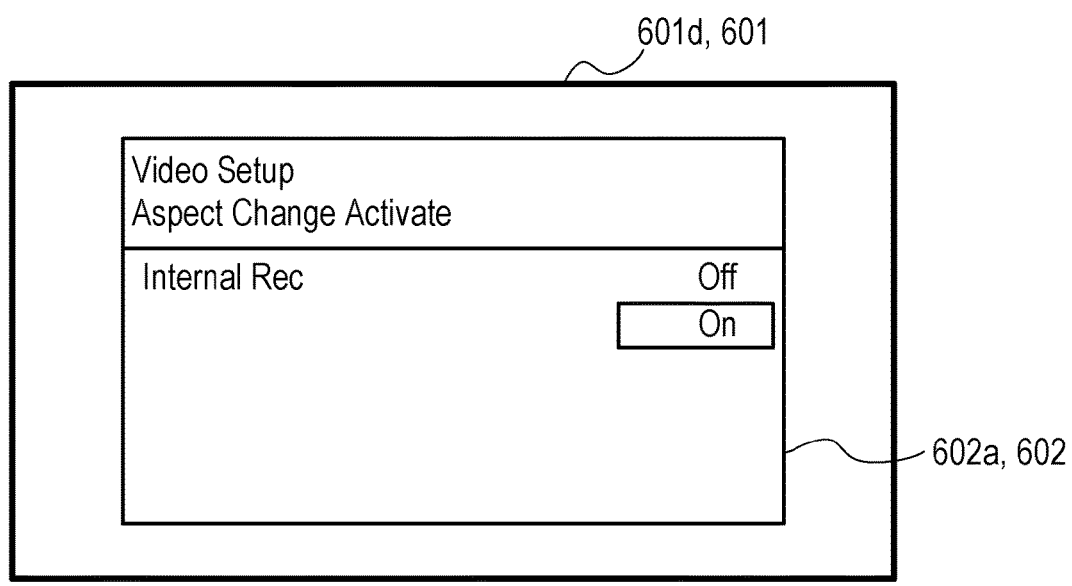
FIG. 6D is a diagram showing a second validity setting screen.
Figure 6E:
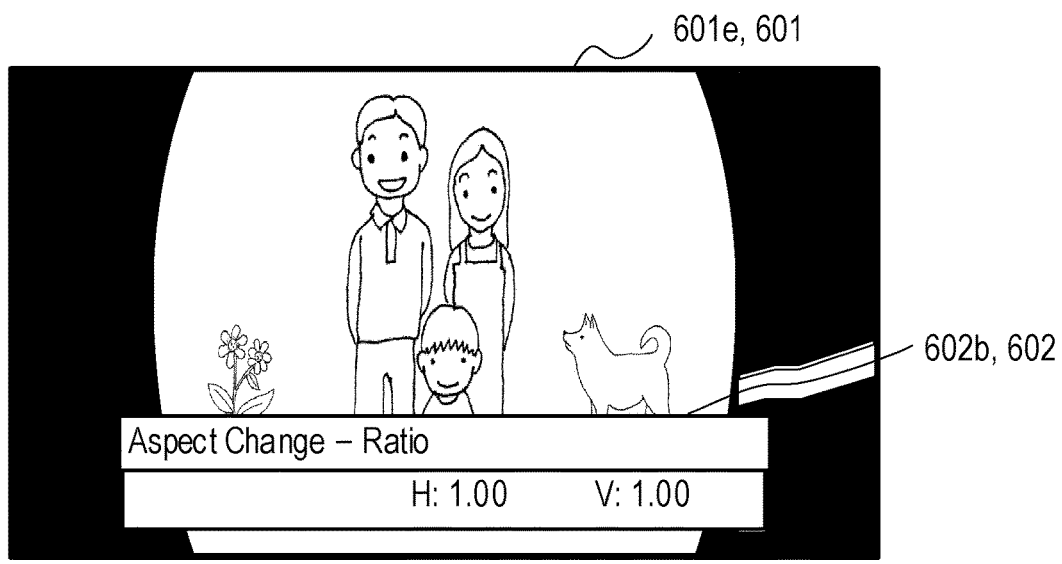
FIG. 6E is a diagram showing an example of an aspect ratio setting screen.
Figure 6F:
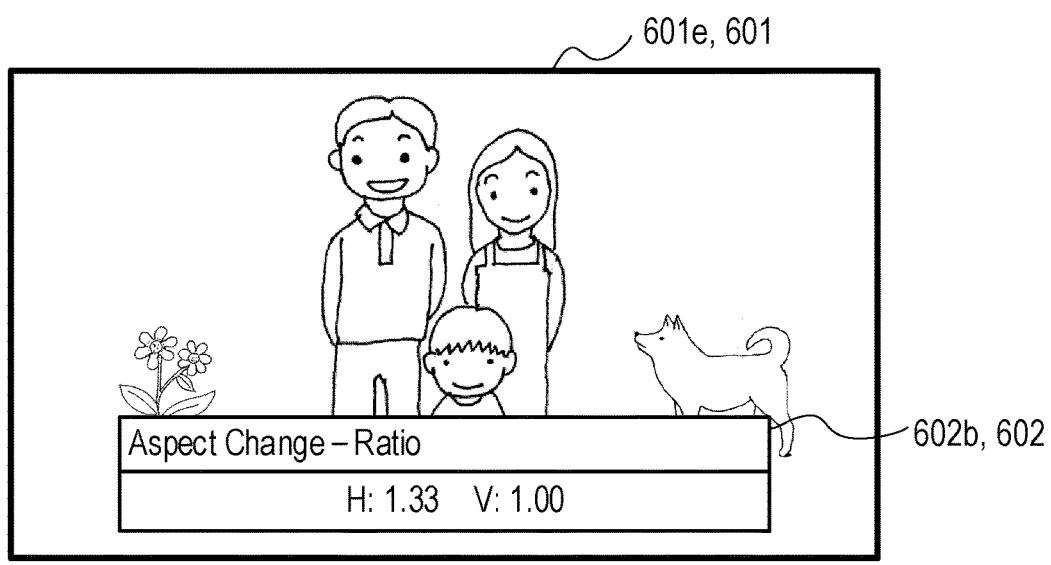
FIG. 6F is a diagram showing another example of the aspect ratio setting screen.

In step S503, the main body control circuit 119 determines whether the same magnitude has been designated on an aspect ratio setting screen 601e shown in FIGS. 6E and 6F. The same magnitude means designating both the change magnification in the horizontal direction and the change magnification in the vertical direction to be one. The main body control circuit 119 advances the processing to step S504 when the same magnitude has been specified and advances the processing to step S505 when the same magnitude has not been specified.

In step S504, the main body control circuit 119 saves information indicating "invalid" for all of the internal recording aspect setting, display device aspect setting, first external output aspect setting, and second external output aspect setting. As a result, the main body control circuit 119 sets so as not to change the aspect ratio.

In step S505, the main body control circuit 119 sets the enlargement/reduction processing circuit 302 so as to output the image data whose aspect ratio has been changed to the recognition/detection/evaluation system processing circuit 303.

In step S506, the main body control circuit 119 determines whether designation has been made for recording the image data whose aspect ratio has been changed, in the recording medium 105. That is, the main body control circuit 119 determines whether the internal recording aspect setting is designated to be "valid" on the first validity setting screen 601c shown in FIG. 6C. The main body control circuit 119 advances the processing to step S507 when the internal recording aspect setting is designated to be "valid", and advances the processing to step S508 when the setting is designated to be "invalid".

In step S507, the main body control circuit 119 makes a setting for recording the image data whose aspect ratio has been changed in the recording medium 105 by saving the information indicating "valid" with respect to the internal recording aspect setting.

In step S508, the main body control circuit 119 makes a setting for recording image data whose aspect ratio has not been changed on the recording medium 105 by saving information indicating "invalid" with respect to the internal recording aspect setting.

In step S509, the main body control circuit 119 determines whether designation has been made for outputting the image data whose aspect ratio has been changed, to the first external terminal. That is, the main body control circuit 119 determines whether the first external output aspect setting is designated to be "valid" on the first validity setting screen 601c shown in FIG. 6C. The main body control circuit 119 advances the processing to step S510 when the first external output aspect setting is designated to be "valid" and advances the processing to step S511 when the setting is designated to be "invalid".

In step S510, the main body control circuit 119 makes a setting for outputting the image data whose aspect ratio has been changed, to the first external terminal by saving information indicating "valid" with respect to the first external output aspect setting.

In step S511, the main body control circuit 119 makes a setting for outputting image data whose aspect ratio has not been changed, to the first external terminal by saving information indicating "invalid" with respect to the first external output aspect setting.

In step S512, the main body control circuit 119 determines whether designation has been made for displaying the image data whose aspect ratio has been changed, on the display device 107. That is, the main body control circuit 119 determines whether the display device aspect setting is designated to be "valid" on the first validity setting screen 601c shown in FIG. 6C. The main body control circuit 119 advances the processing to step S513 when the display device aspect setting is designated to be "valid", and advances the processing to step S514 when the setting is designated to be "invalid".

In step S513, the main body control circuit 119 makes a setting for displaying image data whose aspect ratio has been changed, on the display device 107 by saving information indicating "valid" for the display device aspect setting.

In step S514, the main body control circuit 119 makes a setting for displaying image data whose aspect ratio has not been changed, on the display device 107 by saving information indicating "invalid" for the display device aspect setting.

In step S515, the main body control circuit 119 determines whether designation has been made for outputting the image data whose aspect ratio has been changed, to the second external terminal. That is, the main body control circuit 119 determines whether the second external output aspect setting is designated to be "valid" on the first validity setting screen 601c shown in FIG. 6C. The main body control circuit 119 advances the processing to step S516 when the second external output aspect setting is designated to be "valid", and advances the processing to step S517 when the setting is designated to be "invalid".

In step S516, the main body control circuit 119 makes a setting for outputting image data whose aspect ratio has been changed, to the second external terminal by saving information indicating "valid" with respect to the second external output aspect setting.

In step S517, the main body control circuit 119 makes a setting for outputting image data whose aspect ratio has not been changed, to the second external terminal by saving information indicating "invalid" with respect to the second external output aspect setting.

Next, a screen transition of the setting screen 601 for setting the aspect will be described with reference to FIGS. 6A to 6F. FIGS. 6A to 6F are diagrams showing an example of the setting screen 601. In the illustrations of FIGS. 6A to 6F, it is assumed that the interchangeable lens 101 attached to the digital video camera 100 has an anamorphic lens capable of compressing the subject horizontally.

First, when receiving an operation for setting the digital video camera 100 via the operation member 180, the main body control circuit 119 displays a camera setting screen 601a shown in FIG. 6A on the display device 107 by controlling the display device 107 and the like. The camera setting screen 601a is a screen for accepting information on what kind of settings the user carries out for the digital video camera 100. A first menu part 602a which is a menu part 602 is displayed on the camera setting screen 601a. The first menu part 602a of the camera setting screen 601a displays items that the user can select on the camera setting screen 601a.

While displaying the camera setting screen 601a and when accepting an operation for setting the aspect via the operation member 180, the main body control circuit 119 controls the display device 107 and the like to display an aspect setting screen 601b shown in FIG. 6B on the display device 107.

The aspect setting screen 601b shown in FIG. 6B is a screen for accepting information on whether the aspect validity setting is performed or the user performs the aspect ratio setting. The first menu part 602a is displayed on the aspect setting screen 601b. The first menu part 602a of the aspect setting screen 601b displays items that the user can select on the aspect setting screen 601b. While displaying the aspect setting screen 601b and when receiving an operation of performing the aspect validity setting via the operation member 180, the main body control circuit 119 controls the display device 107 and the like to display the first validity setting screen 601c shown in FIG. 6C on the display device 107.

While displaying the aspect setting screen 601b and when receiving the operation of setting the aspect ratio via the operation member 180, the main body control circuit 119 controls the display device 107 and the like to display the aspect ratio setting screen 601e shown in FIGS. 6E and 6F on the display device 107.

The first validity setting screen 601c shown in FIG. 6C is a screen for accepting information about for which output destination the setting as to whether the change of the aspect ratio is made valid or invalid, is carried out. The user can select, on the first validity setting screen 601c, any one to be performed from among the internal recording aspect setting, display device aspect setting, and external output aspect setting. The first menu part 602a is displayed on the first validity setting screen 601c. The first menu part 602a of the first validity setting screen 601c displays items that the user can select on the first validity setting screen 601c.

While displaying the aspect setting screen 601b and when accepting an operation to set the internal recording aspect, for example, via the operation member 180, the main body control circuit 119 displays a second validity setting screen 601d shown in FIG. 6D on the display device 107.

The second validity setting screen 601d shown in FIG. 6D is a screen for designating "valid" or "invalid" of the internal recording aspect setting. The first menu part 602a is displayed on the second validity setting screen 601d. The first menu part 602a of the second validity setting screen 601d displays items that the user can designate on the second validity setting screen 601d.

When displaying the second validity setting screen 601d, the main body control circuit 119 accepts designation of "valid" or "invalid" via the operation member 180. Thereafter, the main body control circuit 119 performs control to display the first validity setting screen 601c shown in FIG. 6C.

Note that for the display device aspect setting and the first and second external output aspect settings, there is the second validity setting screen 601d for designating "valid" and "invalid" similarly to the second validity setting screen 601d for setting the internal recording aspect.

The first validity setting screen 601c and the second validity setting screen 601d are examples of a first setting screen.

The aspect ratio setting screen 601e shown in FIGS. 6E and 6F is a screen for designating the change amount of the aspect ratio. Image data captured by the digital video camera 100 is displayed on the background of the aspect ratio setting screen 601e. When displaying the aspect ratio setting screen 601e, the display device 107 displays the image data whose aspect ratio has been changed by the enlargement/reduction processing circuit 302 even in the case where the display device aspect setting is set to "invalid".

A second menu part 602b which is the menu part 602 is displayed on the aspect ratio setting screen 601e. Items that can be set by the user are displayed on the second menu part 602b. To be more specific, the second menu part 602b displays the change magnification in the horizontal direction and the change magnification in the vertical direction as change magnification of the aspect ratio. The main body control circuit 119 accepts the change magnification of the aspect ratio designated by the user via the operation member 180 and displays the accepted change magnification of the aspect ratio on the second menu part 602b.

The vertical length of the second menu part 602b is smaller than the vertical length of the first menu part 602a. The area of the second menu part 602b is smaller than the area of the first menu part 602a. That is, the size of the second menu part 602b is smaller than the size of the first menu part 602a.

The digital video camera 100 has a lens attached for compressing the subject in the left-right direction (horizontal direction). Therefore, light does not enter the end portions in the horizontal direction of the imaging element 102. Therefore, when the change magnification of the aspect ratio in the horizontal direction and the change magnification in the vertical direction are both 1.00, the horizontal end portions of the image data which is the background of the aspect ratio setting screen 601e is blackened, as shown in FIG. 6E.

Further, a lens for compressing the subject in the left-right direction (horizontal direction) is attached to the digital video camera 100. Accordingly, as shown in FIG. 6E, the image data as the background of the aspect ratio setting screen 601e is vertically long.

In the aspect ratio setting screen 601e shown in FIG. 6E, it is assumed that the user specifies 1.33 as the change magnification in the horizontal direction of the aspect ratio and specifies 1.00 as the change magnification in the vertical direction. At this time, the display device 107 displays the aspect ratio setting screen 601e having no blackened parts in the background, as shown in FIG. 6F. It is assumed that a 1.33-power anamorphic lens is attached to the digital video camera 100.

In the aspect ratio setting screen 601e, instead of the aspect ratio changing magnification, the number of pixels after changing the aspect ratio may be designated. The aspect ratio setting screen 601e is an example of a second setting screen.

Next, with reference to FIG. 7, setting-time image processing will be described. FIG. 7 is a flowchart of setting-time image processing. The setting-time image processing is processing for displaying the image data as the background of the aspect ratio setting screen 601e and the second menu part 602b shown in FIGS. 6E and 6F. The setting-time image processing is started when the user performs an operation of setting the aspect ratio on the aspect setting screen 601b shown in FIG. 6B.

In step S701, under the control of the main body control circuit 119, the GPU 115 generates image data of the second menu part 602b of the aspect ratio setting screen 601e. The second menu part 602b of the aspect ratio setting screen 601e is smaller in size than the first menu part 602a as described above.

In step S702, the main body control circuit 119 determines whether the image data whose aspect ratio has been changed is set to be output to the display device 107. That is, the main body control circuit 119 determines whether the display device aspect is set to be "valid". The main body control circuit 119 advances the processing to step S704 when the display device aspect setting is "valid" and advances the processing to step S703 when the display device aspect setting is "invalid" instead of "valid".

In step S703, the main body control circuit 119 temporarily sets image data whose aspect ratio has been changed to be displayed on the display device 107. That is, the main body control circuit 119 sets the display device aspect setting to "valid".

In step S704, since the display device aspect setting is "valid", the enlargement/reduction processing circuit 302 generates image data whose aspect ratio has been changed in accordance with the enlargement magnification input on the aspect ratio setting screen 601e, and outputs the image data to the display I/F circuit 106. The display I/F circuit 106 outputs, to the display device 107, the image data of the aspect ratio setting screen 601e, in which the image data whose aspect ratio has been changed and the image data of the second menu part 602b are superimposed on each other. The display device 107 displays the aspect ratio setting screen 601e.

In step S705, the main body control circuit 119 determines whether the operation of changing the aspect ratio on the aspect ratio setting screen 601e has ended, based on the operation received by the operation member 180. The main body control circuit 119 advances the processing to step S706 when the operation for changing the aspect ratio has ended, and restores the processing to step S704 when the operation has not ended.

In step S706, the main body control circuit 119 determines whether the image data whose aspect ratio has been changed is temporarily set to be displayed on the display device 107 in step S703. The main body control circuit 119 advances the processing to step S707 when the display is temporarily set, and advances the processing to step S708 when the display is not temporarily set.

In step S707, the main body control circuit 119 sets the image data whose aspect ratio has not been changed, to be displayed on the display device 107. That is, the main body control circuit 119 sets the display device aspect setting to "invalid".

In step S708, the GPU 115 generates image data of the first menu part 602a under the control of the main body control circuit 119. The display I/F circuit 106 outputs the image data of the setting screen 601 including the image data of the first menu part 602a to the display device 107. The display device 107 displays the setting screen 601. The setting screen 601 displayed by the display device 107 in step S708 is a screen based on the operation accepted by the main body control circuit 119 in step S705, and is the camera setting screen 601a, the aspect setting screen 601b, or the first validity setting screen 601c, for example.

As described above, the enlargement/reduction processing circuit 302 outputs, the image data for which only correction has been performed by the image correction circuit 301, or the image data whose aspect ratio has been changed, to the recording medium 105 or the like, based on the setting, in the second embodiment. Therefore, the image data can be output to each unit according to the preference of the user, the purpose of the user's operation, and the like.

Further, when displaying the aspect ratio setting screen 601e, the main body control circuit 119 controls to display the image data whose aspect ratio has been changed on the display device 107, regardless of the display device aspect setting. The second menu part 602b of the aspect ratio setting screen 601e is smaller in size than the first menu parts 602a of other setting screens 601. Therefore, the user can designate the aspect ratio while watching the image data captured by the digital video camera 100 with the aspect ratio changed according to the magnification specified on the aspect ratio setting screen 601e. Accordingly, the convenience of the user is improved.

In the second embodiment, the digital video camera 100 can output image data having an unchanged aspect ratio as in the first embodiment, and can perform predetermined processing based on the image data whose aspect ratio has been changed.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-054304, filed Mar. 21, 2017, which is hereby incorporated by reference herein in its entirety.

What is claimed is:
1. An imaging apparatus comprising:
at least one memory device;
at least one processor;
a transformation unit configured to transform image data which is based on an output signal of an imaging; and
a processing unit configured to perform processing for obtaining a value to be used as a parameter for imaging control, based on the image data transformed by the transformation unit;
wherein
the image data which is based on the output signal of the imaging element is image data for which compression of a subject image has been caused by a lens used for imaging,
the transformation unit transforms the image data to correct the compression of the subject image for restoration,
the processing unit performs, in a case where a moving image is captured,
the processing for obtaining the value to be used as the parameter for imaging control, based on the image data transformed by the transformation unit, and at least one of outputting image data not transformed by the transformation unit to an external device and storing the image data not transformed by the transformation unit into a storage medium, wherein the transformation unit and the processing unit are implemented by the at least one processor executing at least one program recorded in the at least one memory device.

2. The imaging apparatus according to claim 1, wherein the processing unit is configured to perform at least one of an evaluation value calculation for calculating an evaluation value, a detection processing for detecting a subject, and a recognition processing for performing recognition using the detected subject, based on the image data transformed by the transformation unit, to perform processing for obtaining the value to be used for the parameter for imaging control by performing.

3. The imaging apparatus according to claim 1, wherein the image data which is based on the output signal of the imaging element is image data captured using an anamorphic lens.

4. The imaging apparatus according to claim 1, wherein the processing unit is configured to change an amount of transformation of the image data performed by the transformation unit.

5. The imaging apparatus according to claim 3, wherein the transformation unit is configured to transform the image data which is based on the output signal of the imaging element so as to change an aspect ratio of the image data.

6. The imaging apparatus according to claim 1, wherein the processing unit causes a display device to display the image data transformed by the transformation unit.

7. The imaging apparatus according to claim 6, wherein the processing unit switches between causing the display device to display the image data transformed by the transformation unit and causing the display device to display the image data not transformed by the transformation unit in accordance with a user instruction.

8. The imaging apparatus according to claim 7, wherein the processing unit changes an amount of transformation of the image data by the transformation unit in accordance with a user instruction, even if it is instructed by a user to display the image data not transformed by the transformation unit, the processing unit causes the display device to display the image data transformed by the transformation unit if it is instructed by the user to change the amount of transformation of the image data by the transformation unit.

9. A control method for an imaging apparatus comprising:
transforming image data which is based on an output signal of an imaging element;
processing so as to obtain a value to be used as a parameter for imaging control, based on the image data transformed for changing the aspect ratio;
wherein
the image data which is based on the output signal of the imaging element is image data for which compression of a subject image has been caused by a lens used for imaging,
transforming the image data to correct the compression of the subject image for restoration,
processing, in a case where a moving image is captured,
the processing for obtaining the value to be used as the parameter for imaging control, based on the image data transformed, and
at least one of outputting image data not transformed to an external device and storing the image data not transformed into a storage medium.

10. A non-transitory memory which stores a program for causing a computer of an imaging apparatus to execute a control method, the control method comprising:
transforming image data which is based on an output signal of an imaging element;
processing so as to obtain a value to be used as a parameter for imaging control, based on the image data transformed for changing the aspect ratio;
wherein
the image data which is based on the output signal of the imaging element is image data for which compression of a subject image has been caused by a lens used for imaging,
transforming the image data to correct the compression of the subject image for restoration,
processing, in a case where a moving image is captured,
the processing for obtaining the value to be used as the parameter for imaging control, based on the image data transformed, and
at least one of outputting image data not transformed to an external device and storing the image data not transformed into a storage medium.

* * * * *